US012685261B2

(12) United States Patent
Thiesmann et al.

(10) Patent No.: US 12,685,261 B2
(45) Date of Patent: Jul. 21, 2026

(54) AGRICULTURAL PRODUCTION MACHINE WITH DRIVER ASSISTANCE SYSTEM

(71) Applicant: CLAAS Selbstfahrende Erntemaschinen GmbH, Harsewinkel (DE)

(72) Inventors: Waldemar Thiesmann, Osnabrück (DE); Heinrich Warkentin, Gütersloh (DE); Mohamed Altaleb, Bielefeld (DE); Henner Vöcking, Rietberg (DE); Bastian Bormann, Gütersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 110 days.

(21) Appl. No.: 18/238,590

(22) Filed: Aug. 28, 2023

(65) Prior Publication Data

US 2024/0065155 A1 Feb. 29, 2024

(30) Foreign Application Priority Data

Aug. 26, 2022 (DE) ..................... 10 2022 121 701.9
Jan. 12, 2023 (DE) ..................... 10 2023 100 640.1

(51) Int. Cl.
*A01D 41/127* (2006.01)
(52) U.S. Cl.
CPC ....... *A01D 41/1274* (2013.01); *A01D 41/127* (2013.01)
(58) Field of Classification Search
CPC .......................... A01D 41/1274; A01D 41/127
See application file for complete search history.

(56) References Cited

U.S. PATENT DOCUMENTS 9,002,594 B2 4/2015 Wilken et al.
9,563,852 B1 2/2017 Wiles et al.
(Continued)

FOREIGN PATENT DOCUMENTS

CA 3113203 A1 * 9/2021 .......... A01B 79/005
EP 2401904 A2 1/2012
(Continued)

OTHER PUBLICATIONS

European Search Report for EP Application No. 23179447.0-1105 mailed Feb. 7, 2024.

*Primary Examiner* — Kyle J Kingsland
(74) *Attorney, Agent, or Firm* — Lempia Summerfield Katz LLC

(57) ABSTRACT

An agricultural production machine configured for determining optimized working parameters for the of the agricultural production machine is disclosed. The agricultural production machine has a driver assistance system and a sensor system and performs an agricultural task in a local context. The driver assistance system comprises a map control system that includes one or more maps to optimize work parameters of the process units of the agricultural production machine. A particular characteristic map describes a relationship between working parameters of the process unit and quality parameters using initial working points. When performing the agricultural task, the driver assistance system checks a local context to determine whether a context-related map is available and, if so, replace the basic map with the context-related map in order to determine optimized working parameters.

16 Claims, 4 Drawing Sheets

(56)                    References Cited

U.S. PATENT DOCUMENTS

| | | |
|---|---|---|
| 2006/0025927 A1 | 2/2006 | Hoskinson et al. |
| 2012/0004812 A1 | 1/2012 | Baumgarten et al. |
| 2012/0004813 A1 | 1/2012 | Baumgarten |
| 2012/0059569 A1 | 3/2012 | Saito et al. |
| 2014/0019017 A1 | 1/2014 | Wilken et al. |
| 2014/0129048 A1 | 5/2014 | Baumgarten |
| 2015/0195348 A1 | 7/2015 | Jelle |
| 2016/0086291 A1 | 3/2016 | Hunt |
| 2016/0223511 A1 | 8/2016 | Koshnick et al. |
| 2017/0188515 A1 | 7/2017 | Baumgarten |
| 2018/0196441 A1 | 7/2018 | Muench |
| 2019/0041842 A1 | 2/2019 | Cella et al. |
| 2019/0050948 A1 | 2/2019 | Perry et al. |
| 2020/0015416 A1* | 1/2020 | Barther ................. H04N 7/183 |
| 2020/0093053 A1* | 3/2020 | Ehlert ................... G06Q 50/02 |
| 2020/0305352 A1 | 10/2020 | Bussmann et al. |
| 2020/0309994 A1 | 10/2020 | Eckel et al. |
| 2020/0402184 A1 | 12/2020 | Dasgupta et al. |
| 2021/0007272 A1 | 1/2021 | Schoeny et al. |
| 2021/0015039 A1 | 1/2021 | Vandike et al. |
| 2021/0080615 A1 | 3/2021 | Thomas et al. |
| 2021/0084816 A1 | 3/2021 | Bussmann |
| 2021/0235622 A1* | 8/2021 | Baumgarten ...... A01D 41/1278 |
| 2021/0321567 A1 | 10/2021 | Sidon et al. |
| 2022/0092705 A1 | 3/2022 | Khait et al. |
| 2022/0110256 A1 | 4/2022 | Vandike |
| 2022/0113142 A1 | 4/2022 | Vandike et al. |
| 2022/0192084 A1 | 6/2022 | Mizushima et al. |
| 2022/0232763 A1 | 7/2022 | Palla et al. |
| 2023/0078766 A1 | 3/2023 | Yuki et al. |
| 2023/0081037 A1 | 3/2023 | Kertai et al. |
| 2023/0140704 A1 | 5/2023 | Chen et al. |
| 2023/0270038 A1 | 8/2023 | Vandike et al. |
| 2024/0057506 A1 | 2/2024 | Duckworth et al. |

FOREIGN PATENT DOCUMENTS

| | | |
|---|---|---|
| EP | 2687922 A2 | 1/2014 |
| EP | 2728523 A1 | 5/2014 |
| EP | 3180974 A1 | 6/2017 |
| EP | 4014734 A1 | 6/2022 |
| WO | 2019046968 A1 | 3/2019 |
| WO | 2022090270 A1 | 5/2022 |

* cited by examiner

AGRICULTURAL PRODUCTION MACHINE WITH DRIVER ASSISTANCE SYSTEM

CROSS REFERENCE TO RELATED APPLICATIONS

This application claims priority under 35 U.S.C. § 119 to German Patent Application No. DE 10 2022 121 701.9 filed Aug. 26, 2022, and to German Patent Application No. DE 10 2023 100 640.1 filed Jan. 12, 2023, the entire disclosure of both of which are hereby incorporated by reference herein. This application is also related to U.S. application Ser. No. 18/238,591, incorporated by reference herein in its entirety.

TECHNICAL FIELD

The present invention relates to an agricultural production machine comprising a driver assistance system which is configured to generate working parameters, such as optimized working parameters, of the agricultural production machine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

There are many different kinds of agricultural production machines. By way of examples, agricultural production machines may comprise harvesting machines (e.g., combine harvesters and forage harvesters) and prime movers (e.g., tractors).

Agricultural production machines may be adapted to their particular agricultural task using a variety of working parameters (interchangeably termed machine parameters or operating parameters). These working parameters may, for example, be any one, any combination, or all of: an engine speed; a threshing drum speed; a PTO shaft torque; the gap of a grain cracker; the driving speed; and the like. There are various approaches to optimize these working parameters with respect to certain objectives. For example, this optimization may be performed by the user himself/herself (who may be the driver of the agricultural production machine), in cooperation with a driver assistance system, or fully automated.

For example, the user may assign strategy specifications to the driver assistance system (e.g., select a predefined strategy or weight several competing optimization goals). The driver assistance system may convert these strategy specifications into optimized working parameters with the aid of an application instruction, which may be map-based, for example. In turn, the optimized working parameters may be used to automatically control one or more aspects of the agricultural production machine.

US Patent Application Publication No. 2012/0004812 A1, incorporated by reference herein in its entirety, describes how, in agricultural machines, optimized working parameters may be determined from strategy specifications (such as the selection criteria and optimization criteria therein) of a user of the agricultural production machine via an application instruction (such as the characteristic curves therein in combination with the automatic controllers). The application instruction may, in principle, be adapted or modified to the local context, for example by involving or receiving input from an external consultant who contributes expert knowledge.

In U.S. Pat. No. 9,002,594 B2, incorporated by reference herein in its entirety, the application instruction, which may comprise the family of characteristics (e.g., maps), may be successively improved in the field during the execution of an agricultural task, such as by approaching different working points in order to take into account the influence of the local context (e.g., weather, climate, crop types, soil types, etc.) on the theoretical family of characteristics.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
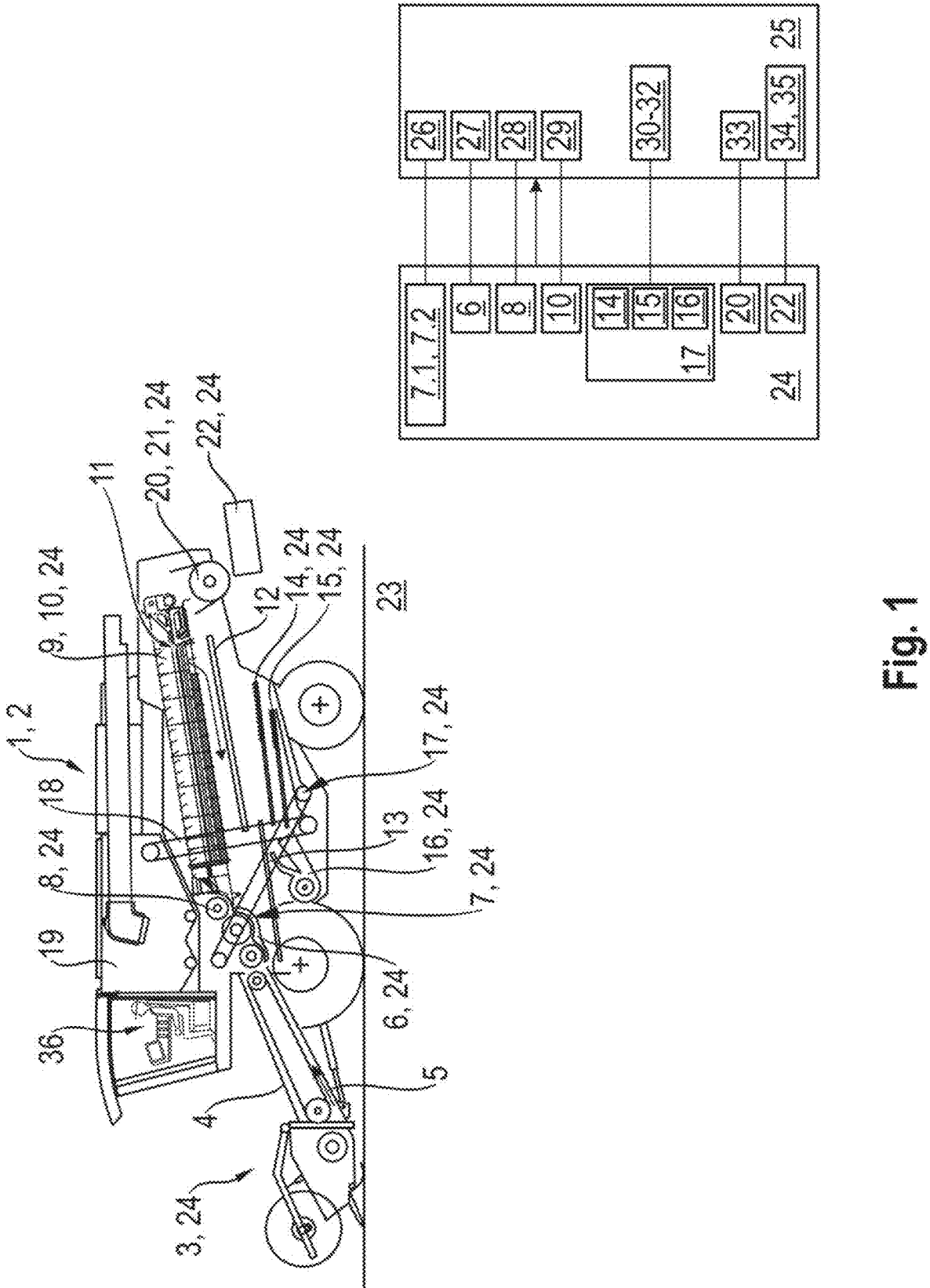
FIG. 1 illustrates the agricultural production machine with the assistance system according to the invention in a schematic representation.

As discussed in the background, optimization of the working parameters may be performed. However, a problem with successive optimization of the working parameters with regard to the local context is that this may require a certain amount of time, such as 30 minutes, to determine or parameterize the maps to such an extent that optimized working parameters may then be determined from the maps for various changes in the field conditions, for example. For this purpose, the agricultural production machine may, for example, run through several non-optimized operating points (e.g., combinations of operating parameters) in order to determine interpolation points of the map or maps. During this optimization routine, the agricultural production machine therefore may operate with changing and non-optimal settings of working parameters.

Therefore, it may be a challenge to arrive at optimized machine parameters faster and/or more efficiently.

Thus, in one or some embodiments, an agricultural production machine is disclosed that is configured for determining working parameters, such as optimized parameters, and comprises at least one driver assistance system and a sensor assembly. The agricultural production machine may be configured to perform an agricultural task in a local context. Further, the driver assistance system comprises a map control system (interchangeably termed a characteristic diagram control system), wherein the map control system may comprise one or more maps with each map being configured to optimize working parameters of the process units of the agricultural production machine. Specifically, a respective map may describe at least the relationship between working parameters of a process unit and quality parameters by using initial working points. Further, one, some or each of the maps may be designed as basic maps, with the driver assistance system is configured to check, in a local context while an agricultural working task is being carried out, whether a context-related map is available (e.g., was previously used) and, if such a map is available, to replace the basic map with the context-related map (or to use the context-related map instead of the basic map) in order to determine optimized working parameters. Further, the map control system may also be configured to use the context-related map as initial maps. In this way, faster and more efficient optimization of working parameters of the agricultural production machine may be possible. This may be achieved, in particular, by replacing a basic map stored in the agricultural production machine with a map relating to the specific context (or using the map relating to the specific context instead of the basic map) so that the agricultural production machine starts the optimization process with a map better adapted to a specific context and more quickly arrives at optimized values of the working parameters to be optimized. In turn, the optimized values of the working parameters may be used to automatically control the agricultural production machine in performing the agricultural task.

In one or some embodiments, a model quality module is assigned to the driver assistance system, such as to the map control system, wherein the model quality module defines a model quality of the context-related map, for example, such that the model quality determines the time period until the optimized working parameters resulting from the selected strategy specification may be achieved or determined. This may have the particular effect of allowing the quality of the optimization of the working parameters achieved by the map control system to be checked.

In one or some embodiments, so that the computational effort for replacing a basic map with a context-related map does not overtax the performance of the existing computing device, an advantageous further development of the invention provides that a threshold value may be assigned to the model quality, and the basic map may be overwritten by the context-related map when the threshold value is reached. In this regard, a metric may be used in order to trigger whether to overwrite the basic map with the context-related map.

In one or some embodiments, the driver assistance system, such as the map control system associated therewith, may be such that the context-related map that is used may be automatically checked, such as always automatically checked, if the conditions of the local context change during the performance of an agricultural task in a local context. Specifically, responsive to automatically detecting change in the local context, the used context-related map may then be replaced by an adapted context-related map (e.g., responsive to determining that the threshold value of the model quality of the model quality module is reached, replacing the used context-related map with the adapted context-related map). This may have the effect in particular that it is possible to react better to conditions that change significantly over the course of the day and result in a significant or even sudden deterioration of the model quality.

In one or some embodiments, the driver assistance system, such as the map control system assigned thereto, may be such that the used context-related map is checked, such as always checked, whenever the agricultural production machine is used under the same conditions on a following day, wherein the used context-related map may then be replaced by an adapted context-related map. For example, responsive to automatically determining that the threshold value of the model quality of the model quality module is reached, the used context-related map may be replaced by an adapted context-related map. This may have the effect that daily changing harvesting conditions, which may have a direct influence on the optimization of the working parameters, may be better taken into account.

In one or some embodiments, the driver assistance system, such as the map control system assigned thereto, may be such that the used context-related map may be automatically checked, such as always automatically checked, whenever the context-related map is to be exchanged under the same conditions at the same time or on the following day between different agricultural production machines, wherein the used context-related map may then be replaced by an adapted context-related map. For example, responsive to automatically determining that the threshold value of the model quality of the model quality module has been reached, the used context-related map may then be automatically replaced by an adapted context-related map. In particular, this may have the effect that harvesting conditions, which may change daily and conditions that may change from agricultural production machine to agricultural production machine which have a direct influence on the optimization of the working parameters, are better taking into account. In this context, it may be advantageous if the various production machines comprise production machines of a machine fleet or production machines of different machine fleets so that the driver assistance system according to one aspect of the invention may be used universally.

In one or some embodiments, when the driver assistance system, such as the map control system assigned thereto, is such that the used context-related map may be automatically checked, such as always automatically checked, whenever the context-related map is to be exchanged between agricultural production machines that are in use in different regions, wherein the used context-related map may then be replaced by an adapted context-related map. For example, responsive to automatically determining that the threshold value of the model quality of the model quality module is reached, the used context-related map may then be automatically replaced by an adapted context-related map. This may have the effect that regionally changing harvesting conditions, which have a direct influence on the optimization of the working parameters, are better taken into account.

In one or some embodiments, the driver assistance system, such as the map control system associated therewith, may be such that the used context-related map is automatically checked, such as always automatically checked, whenever the context-related map is to be exchanged between agricultural production machines, which may be used at different times of a year, wherein the different times of a year may comprise different times of the same year or different years, wherein the used context-related map may then be replaced by an adapted context-related map. For example, responsive to automatically determining that the threshold value of the model quality of the model quality module is reached, the used context-related map may then be automatically replaced by an adapted context-related map. This may have the effect that seasonally changing harvesting conditions, which have a direct influence on the optimization of the working parameters, are better taken into account.

In one or some embodiments, a control assembly may be provided or used for distributing optimized context-related maps. The control assembly may have a database with stored strategy parameters and associated data on local contexts (e.g., the stored strategy parameters has correlated to it data on local contexts), and the stored strategy parameters of driver assistance systems of agricultural production machines may be successively optimized in optimization routines during the execution of agricultural tasks in local contexts from initial strategy parameters for adaptation to the particular local context. Further, the driver assistance system (resident on the agricultural production machine) may determine context data of the local context of the agricultural task, such as by using sensor data generated by the sensor assembly, and may transmit the context data of the local context to the control assembly such that the control assembly determines context-related maps adapted to the local context based on a comparison of the received context data with the context data from the database and transmits them to the driver assistance system of the agricultural production machine. In turn, the driver assistance system may use the transmitted context-related characteristic maps as basic maps. In this way, it may be ensured that faster and/or more efficient optimization of the working parameters of the agricultural production machine is possible using data transmission systems which may be less susceptible to interference.

In one or some embodiments, a cost-effective limitation of the computing effort of an agricultural production machine may be achieved in this context if the control assembly is arranged or positioned externally to the agricultural production machine, such as if the control assembly is formed by one or more servers (e.g., sitting on the Internet) and communicates with the agricultural production machine via the Internet, and/or a plurality of strategy parameters are stored in the database which originate from other, such as similar, agricultural production machines.

In one or some embodiments, a particularly efficiently operating agricultural production machine may result if the agricultural production machine is configured for optimized determination of working parameters of the agricultural production machine, wherein the agricultural production machine has a driver assistance system and a sensor assembly. The agricultural production machine may be configured to perform an agricultural task in a local context, wherein the driver assistance system may be configured to automatically determine optimized working parameters for the agricultural production machine to perform the agricultural task in a determination routine using a parameterizable strategy, wherein the strategy may comprise strategy specifications, an application instruction and the optimized working parameters, and wherein the strategy may be parameterized by strategy parameters for adaptation to a local context. The driver assistance system may be configured to automatically use the strategy specifications as input parameters of the application instruction in the determination routine in order to automatically determine the optimized working parameters optimized with respect to the strategy specifications as output parameters of the application instruction. Further, the driver assistance system may be configured to automatically parameterize the strategy with initial strategy parameters at the beginning of the execution of the agricultural task in order to determine the optimized working parameters. The strategy may comprise at least one characteristic map. Moreover, the driver assistance system may be configured to automatically determine the optimized working parameters on the basis of the strategy specifications from the map or the maps using the application instruction, wherein the map may be designed as a basic map and/or as a context-related map.

Thus, in one or some embodiments, the described driver assistance system may be used in a wide range of agricultural production machines 1, such as harvesters. Further, such agricultural production machines 1 may be used for a variety of different agricultural tasks. By way of example, FIG. 1 shows an agricultural production machine 1 designed as a combine harvester 2 during a harvesting activity.

In these agricultural tasks, various different work parameters may be automatically set in the agricultural production machines 1. In turn, at least a part of the agricultural production machine 1 may be automatically controlled using the values that are automatically set, thereby automatically controlling one or more aspects of the agricultural production machine 1.

The combine harvester 2 shown schematically in FIG. 1 accommodates a harvesting header 3 (or other type of attachment) in its front area, which may be connected in a manner known per se to the inclined conveyor 4 of the combine harvester 2. Example combine harvesters are disclosed in US Patent Application Publication No. 20200305352A1 and US Patent Application Publication No. 2021/0084816A1, each of which are incorporated by reference herein in their entirety. The flow of harvested material 5 passing through the inclined conveyor 4 may be transferred in the upper rear region of the inclined conveyor 4 to the threshing units 7 of the combine harvester 2, which may at least be partially surrounded by a so-called threshing concave 6 on the bottom. A deflection drum 8 downstream from the threshing units 7 may divert the flow of harvested material 5 out of the threshing units 7 in their rearward area so that the flow is immediately transferred to a separating device 10 designed as a separating rotor assembly 9. In one or some embodiments, the separating device 10 may also be designed as a straw walker (not shown). It is also contemplated that the separating device may be designed only with a single rotor or two rotors, or the threshing units 7 and the separating device 10 are combined to form a single- or double-rotor axial flow threshing and separating device.

In the separating device 10, the flow of harvested material 5 may be conveyed in such a way that free-moving grains 11 contained in the flow of harvested material 5 are separated in the downstream region of the separating device 10. The grains 11 deposited both on the threshing concave 6 as well as in the separating device 10 may be fed over a returns pan 12 and a feed pan 13 of a cleaning device 17 comprising (or consisting of) a plurality of screening levels 14, 15 and a blower 16. The cleaned flow of grains may be then transferred using elevators 18 to a grain tank 19.

In addition, a shredding device 21 comprising a straw chopper 20 may be associated with the separating device 10 in the rear area. In addition, in the outlet area of the straw chopper 20, a material spreading unit 22 may be positioned, which spreads the residual material conveyed out of the combine harvester 2 on the ground 23.

The harvesting header 3, the threshing units 7, the threshing concave 6, the deflection drum 8, the separating device 10, the cleaning device 17 and here in particular the screening levels 14, 15 and the blower 16, the shredding device 21, here the straw chopper 20 and the material spreading unit 22 may form the process units 24. In this regard, any one, any combination or all of the process units 24 described herein may be automatically controlled by the optimized values automatically selected for the working parameters 25. Moreover, merely by way of example, the working parameters 25 of these process units 24 may be any one, any combination, or all of the following:

the threshing units 7 may be formed by a plurality of threshing drums 7.1, 7.2, and the working parameter 25 depicts the particular threshing drum speed 26. The working parameter 25 of the threshing concave 6 may be, for example, its so-called threshing gap width 27. The working parameter 25 of the deflection drum 8 associated with the threshing units 7 may be its speed 28. Depending on the specific design of the separating device 10, its working parameters 25 may be entirely different in nature. For example, the particular rotor speed 29 or the opening widths of the separating jacket of the separating device 10, which are not shown here, may comprise working parameters 25. The working parameters 25 of the cleaning device 17 may comprise the vibration frequency and vibration direction 30, 31 of the screening levels 14, 15 and the rotational speed 32 of the blower 16. The working parameter 25 of the straw chopper 20 may, for example, be limited to the speed 33 of the chopper shaft, which is not shown in detail here. The working parameters 25 of the material spreading unit 22 may be, in a manner known per se and therefore not described in detail here, the speed 34 of the ejection units (not shown in detail) and the discharge point 35 of the residual material stream from the material spreading unit 22.

Furthermore, the agricultural production machine 1 may comprise a driver assistance system 36 for controlling the harvesting header 3 and the combine harvester 2.

Figure 2:
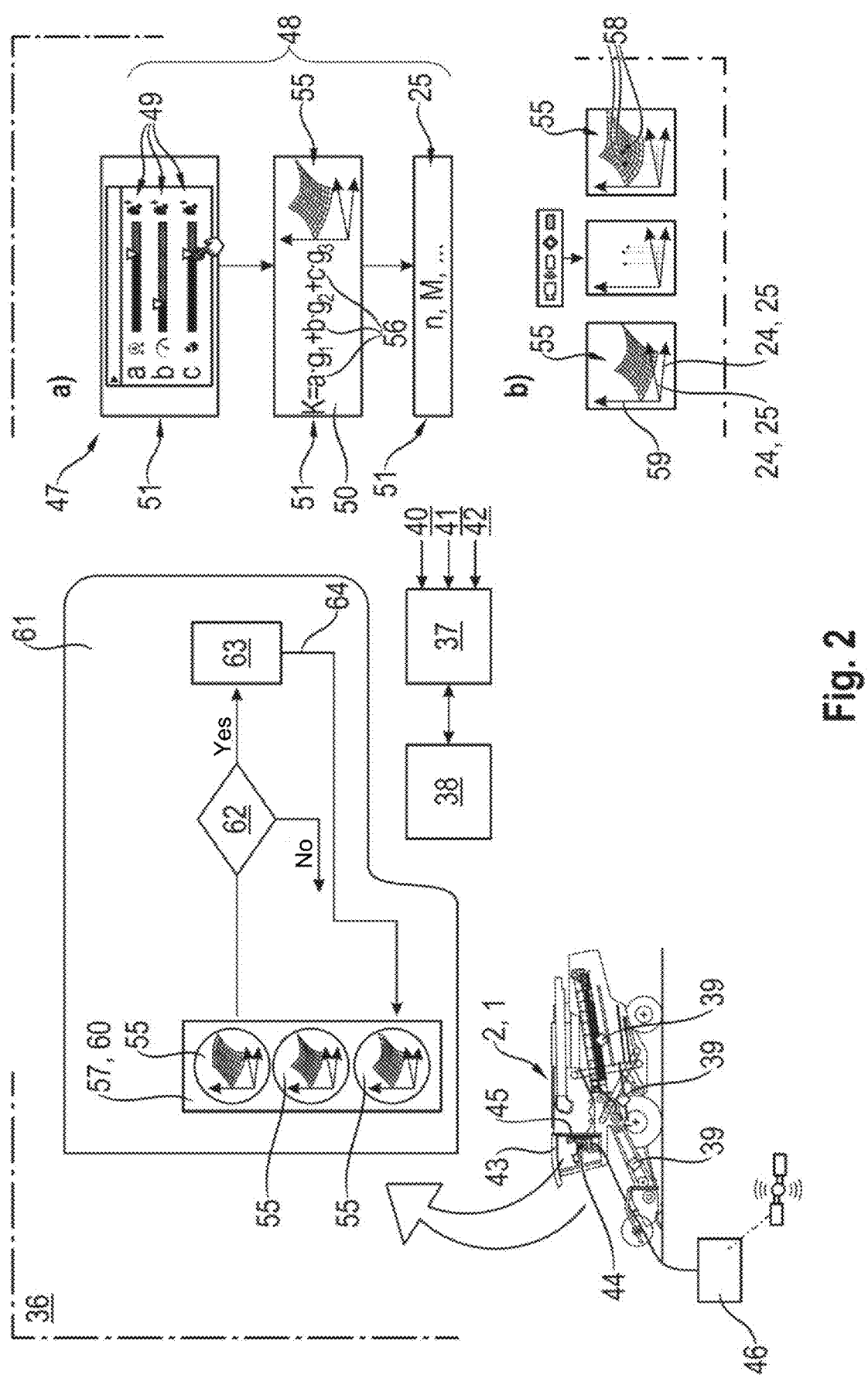
FIG. 2 illustrates a detailed representation of the assistance system according to the invention.

The driver assistance system 36 may comprise, according to FIG. 2, a memory 37 for saving data, to be explained in more detail, and a computing unit 38 for processing the data saved in the memory 37. The computing unit 38 may include at least one processor, with the processor configured to execute the software stored in the memory 37 (or in another memory device), which may comprise a non-transitory computer-readable medium that stores instructions that when executed by processor performs any one, any combination, or all of the functions described herein. Thus, the various routines described herein may comprise software routines, which may be executed by computing unit 38. In this regard, the computing unit 38 may comprise any type of computing functionality, such as the at least one processor (which may comprise a microprocessor, controller, PLA, or the like) and a memory (such as memory 37 or a separate memory). The memory 37 may comprise any type of storage device (e.g., any type of memory). As shown in FIG. 2, computing unit 38 and memory 37 are depicted as separate elements. Alternatively, computing unit 38 and memory 37 may be part of a single machine, which includes a microprocessor (or other type of controller) and a memory. Alternatively, computing unit 38 may rely on memory 37 for all of its memory needs.

The computing unit 38 is merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The data saved in the memory 37 may initially comprise any one, any combination, or all of information 40 generated by internal machine sensor systems 39, information 41 generated by external systems, and information 42 saved directly in the computing unit 38. The driver assistance system 36 may be operated via a control and display unit 44

(e.g., a touchscreen) arranged or positioned in the cab 43 of the combine harvester 2. In principle, the driver assistance system 36 is configured to assist a driver 45 of the combine harvester 2.

In this way, the agricultural production machine 1 may first be configured to optimize the determination of working parameters 25 of the agricultural production machine 1, wherein the driver assistance system 36, in interaction with or communication with the machine-internal sensor systems 39, is of decisive importance for this purpose. The agricultural production machine 1 created in this way is thereby configured to perform an agricultural task, such as the harvesting of a field, in a local context 61, on a specific field in a specific region. The local context 61 is some or all influencing variables that in fact exist at the place where the agricultural task is performed (e.g., locally) and that may have an influence on the result of the agricultural task. In one or some embodiments, insofar as the term is used here, however, the local context 61 may mean only that part of these influencing variables which is also known by the agricultural production machine 1, such as by the driver assistance system 36, and/or by the control assembly 46 yet to be explained. The influencing variables may be measured, but may also be obtained from a weather service, for example. The local context 61 may comprise any one, any combination, or all of: the weather; the climate; a crop type; crop variety; harvesting conditions (such as a straw or grain moisture); selected crop protection measures; degree of maturation; or soil condition. Additionally, a machine configuration may be taken into account. In one or some embodiments, GPS data may be used to determine the local context 61.

The driver assistance system 36 may then automatically determine one or more working parameters 25, which may be optimized using a parameterizable strategy 48, for the agricultural production machine 1 for performing the agricultural task in a determination routine 47. After which, the driver assistance system 36 may then automatically implement the one or more working parameters 25 in order to automatically control one or more process units 24 of the agricultural production machine 1. This process is shown abstractly in FIG. 2 and is explained further below. The strategy 48 comprises strategy specifications 49, an application instruction 50 and the optimized working parameters 25. Generally, the strategy 48 may be parameterizable using strategy parameters 51 for adaptation to a local context 61, as explained further below. In the determination routine 47, the driver assistance system 36 may use the strategy specifications 49 as input parameters of the application instruction 50 to determine the optimized working parameters 25 as output parameters of the application instruction 50. The optimized working parameters 25 may thereby be optimized with respect to the strategy specifications 49.

In order to then determine the optimized work parameters 25 for a new agricultural task, the driver assistance system 36 may parameterize the strategy 48 with initial strategy parameters at the beginning of the execution of the agricultural task. The initial strategy parameters may still be adapted or modified during the execution of the agricultural task. Strategy parameters 51 may include abstract strategies 48 and/or weightings of quality parameters 59. In this case, the abstract strategies 48 may comprise a machine-friendly strategy 48 with low wear of the autonomous agricultural production machine 1 and/or an eco-mode with low energy consumption but longer working time, and/or fast working with higher fuel consumption, and/or a higher harvesting quality with more time, and/or a high throughput with lower harvesting quality. The quality parameters 59 may comprise competing quality parameters 59 for which the user may graphically set a weighting, as exemplified in FIG. 2 for three quality parameters 59. The graphical display thereby may visualize the competition or contrast between the quality parameters 59. The optimization may consequently be a multi-objective optimization. In this case, the strategy specifications 49 may be specified by the user.

The definition of the particular quality parameter 59 may be of great importance in the present case. In this case, each quality parameter 59 may be very generally defined by a goal of optimizing or adjusting a working parameter. The term "optimization" may, in the simplest case, comprise maximization or minimization of the particular working parameter. Other implementations of "optimization" are contemplated. The term "setting" may mean that the particular work parameter is to have a particular value, and the driver assistance system 36 automatically optimizes the work parameter to have that value, if possible (thereby, in turn, automatically controlling operation of one or more aspects of the agricultural production machine 1). The quality parameters 59 may be selected from the list comprising any one, any combination, or all of "threshing out", "broken grain fraction", "separation losses", "cleaning losses", "threshing unit drive slip", "fuel consumption", "throughput", "cleanliness" and "straw quality". For example, a working parameter 25 may also be a travel speed or a harvested material throughput. The working parameters 25 may be adjusted by the interaction of machine-related working parameters 25 with local conditions.

In one or some embodiments, the driver assistance system 36 uses strategy parameters 51 as the initial strategy parameters that have already been optimized by at least one agricultural production machine 1 in a similar local context 61. The initial strategy parameters may have been optimized by one agricultural production machine 1, or strategy parameters 51 of several agricultural production machines 1 may be linked. Initial strategy parameters may be strategy parameters 51 that are used at the beginning of the execution of the agricultural task to parameterize the strategy 48. In one or some embodiments, the initial strategy parameters comprise initial coefficients 56 of maps 55 of the application instruction 50, as will be explained. These initial coefficients 56 may be used to parameterize initial maps 55. The initial maps 55 may be automatically used at the beginning of the execution of the agricultural task. Overall, therefore, the term "initial" as used herein always may refer to the beginning of an agricultural task. Instead of the agricultural production machine 1 starting with a default configuration, the agricultural production machine 1 may use initial strategy parameters that have a higher chance of more closely and quickly approaching an optimum of the working parameters 25. The strategy parameters 51 may include strategy specifications 49, coefficients 56 of maps 55, and the like. The optimized work parameters 25 may be automatically set by the driver assistance system 36 in the agricultural production machine 1 and may be used to automatically perform at least a part of the agricultural task (e.g., automatically control one or more of the process units 24 of the agricultural production machine 1).

The one or more maps 55 stored in the driver assistance system 36 may form or be a part of the map control system 57 associated with the driver assistance system 36. As described, each map 55 may be configured to optimize working parameters 25 of the process units 24 of the agricultural production machine 1, wherein the particular map 55 may describe at least the relationship between working parameters 25 of a process unit 24 and quality parameters 59 by means of initial working points 58.

In one or some embodiments, the maps 55 assigned to the driver assistance system 36 of the agricultural production machine 1, such as the combine harvester 2, may be initially designed as basic maps 60, wherein the driver assistance system 36 is configured to automatically check in a test step 62 whether or not a context-related parameterized map 63 is available when performing an agricultural task in a local context 61. If a context-related map 63 is not available, the driver assistance system 36 automatically uses the stored basic map or maps 60. If one or more context-related maps 63 are available, the driver assistance system 36 automatically replaces the stored basic map or maps 60 by the context-related map or maps 63 (e.g., accesses the context related map 63 as opposed to the basic map 60) for determining optimized working parameters 25 so that the map control system 57 is configured to use the context-related map or maps 63 as initial maps 64.

Figure 3:
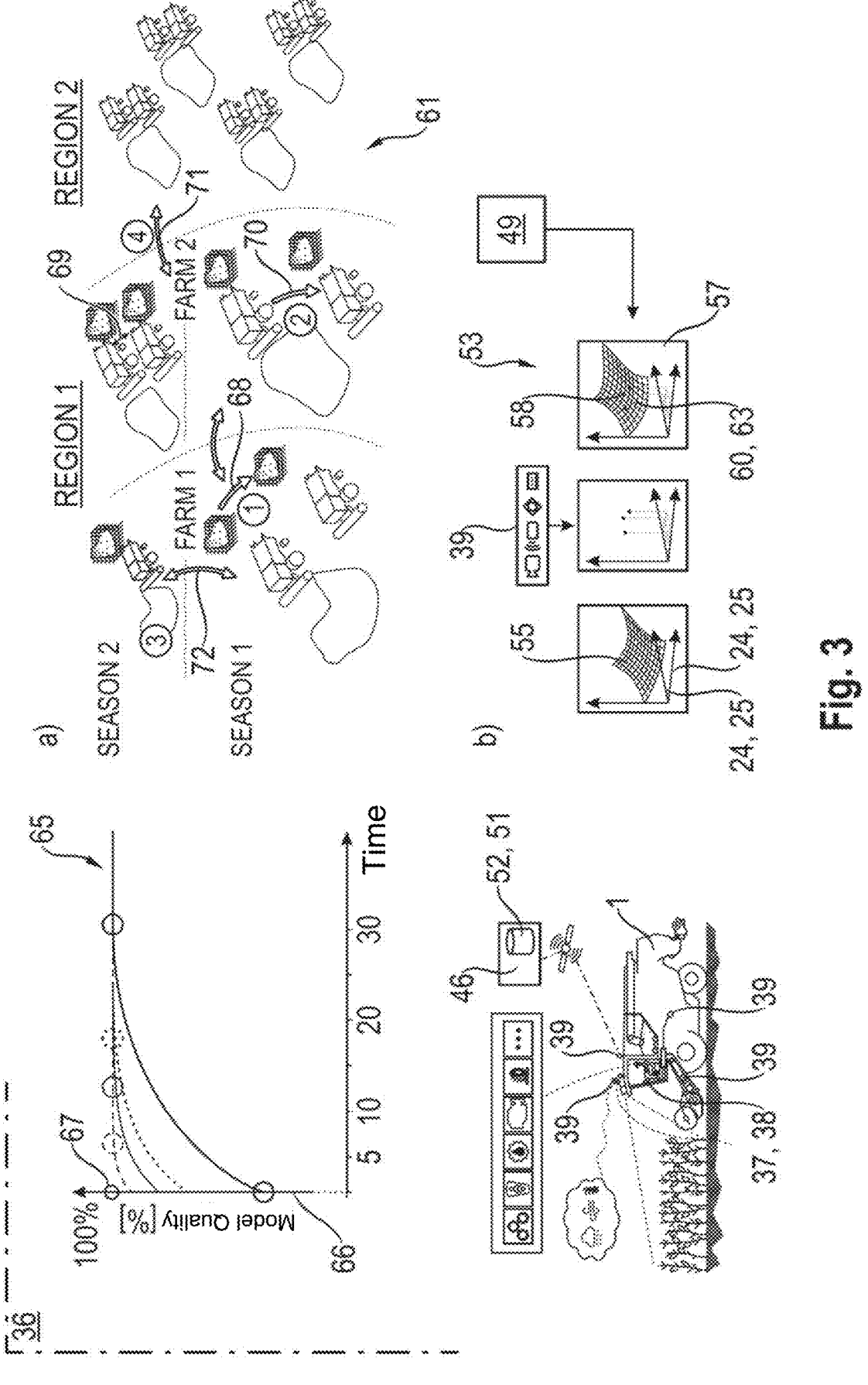
FIG. 3 illustrates a detailed representation of the driver assistance system.

FIG. 3 describes further details of the driver assistance system 36 according to one aspect of the invention. The aforementioned control assembly 46 may implement the described map control system 57 of the driver assistance system 36. The control assembly 46 may, in principle, be part of the agricultural production machine 1, such as a part of the driver assistance system 36. Alternatively, control assembly 46 may be arranged externally thereto. In the following, the steps of the method using the control assembly 46 will be explained. In one or some embodiments, the control assembly 46 has a database 52 with the stored strategy parameters 51 and associated data on local contexts 61 (e.g., the local contexts 61 are correlated to different stored strategy parameters 51). The database 52 may be part of the control assembly 46 or external thereto. The stored strategy parameters 51 may have been successively optimized by driver assistance systems 36 of agricultural production machines 1 in optimization routines 53 during the execution of agricultural tasks in local contexts 61 from initial strategy parameters for adaptation to the particular local context 61. This may be historical and/or current daily data, which in principle may originate from the vicinity (e.g., locally, such as within a predetermined distance of the local context) or from all over the world.

In one or some embodiments, the driver assistance system 36 is configured to automatically determine context data of the local context 61 of the agricultural task, such as by using the sensor systems 39, and to automatically transmit the context data to the control assembly 46. In addition or alternatively, the control assembly 46 may automatically determine the context data itself, such as from GPS data of the agricultural production machine 1. The determination may also be limited to a pure selection (e.g., based on selection by an operator of the agricultural production machine 1 via a touchscreen). In one or some embodiments, a plurality of stored initial strategy parameters may be formed from a plurality of local contexts (e.g., one or more aspects of the local contexts stored in the database are similar, such as the same or identical, or within a predetermined value of, of one or more aspects of the local context of the agricultural production machine 1). As one example, mean values of a plurality of initial strategy parameters may be formed from similar contexts (e.g., local contexts stored in the database that are the same or similar to the current local context or current conditions), or they may otherwise be linked and transmitted as initial strategy parameters. When averaging (as one way to combine different initial strategy parameters correlated in the database to the same or similar local contexts), the initial strategy parameters from similar contexts may be weighted, such as depending on a confidence level of the data and/or a similarity index. Based on a comparison of the received context data with the context data from the database 52, the control assembly 46 may automatically determine initial strategy parameters adapted to the local context 61 and automatically transmit the initial strategy parameters to the driver assistance system 36 of the agricultural production machine 1.

As previously described, during the execution of the agricultural task, such as at the beginning of the execution of the agricultural task, the agricultural production machine 1 may automatically determine sensor data relating to the achievement of the strategy specifications 49 using the sensor system 39 in an optimization routine 53 controlled by the driver assistance system 36. In the optimization routine 53, the driver assistance system 36 may automatically successively optimize the initial strategy parameters based on the sensor data, which may ultimately lead to optimized working parameters 25. In this way, the initial strategy parameters may be used as a starting point of the optimization routine 53, which may yield better results at the beginning of the optimization routine 53. Also, it is made possible that the optimization routine 53 may be shortened.

In addition, a transfer of initial strategy parameters and their use analogous to the described automatic use in later phases of the execution of the agricultural task may be provided. In particular, the agricultural production machine 1 may automatically compare its own performance with the performance of other agricultural production machines 1 and, depending on the performance, again use initial strategy parameters of another agricultural production machine 1. Subsequently, an optimization routine 53 may be performed again.

In one or some embodiments, the driver assistance system 36 may subsequently automatically transmit the thus-optimized strategy parameters 51 and the context data to the control assembly 46. In this case, the user may set the strategy specifications 49 and/or optimization criteria. In principle, it may nevertheless also be provided that the user may intervene more deeply in the system and even set working parameters 25 individually. Furthermore, it is provided in this case that the driver assistance system 36 may automatically set various working parameters 25 in the optimization routine 53, which may form initial working points 58 of the particular characteristic map 55 or maps 55. The driver assistance system 36 may initially automatically set the optimized working parameters 25 of the initial strategy parameters as optimized working parameters 25 in the agricultural production machine 1 by replacing the stored basic map 60 with the determined context-related map 63 as already described.

In one or some embodiments, the driver assistance system 36 and, in particular, the map control system 57 may be assigned a model quality module 65 in which a model quality 66 of the context-related map 63 is defined, for example such that the model quality 66 automatically determines the time interval until the optimized working parameters 25 resulting from the selected strategy specification 49 have been achieved. First of all, this may have the advantage that the quality of the optimization of the working parameters 25 achieved using the map control system 57 becomes verifiable. So that, in this context, the computational effort for replacing a basic map 60 with a context-related map 63 does not overtax the performance of the existing computing unit 38, it may furthermore be provided in one or some embodiments that a threshold value 67 is assigned to the model quality 66, and when the threshold value 67 is reached (or exceeded), the basic map 60 is automatically overwritten by the context-related map 63 (e.g., an example of changing use from the basic map 60 to the context-related map 63).

Figure 3A:
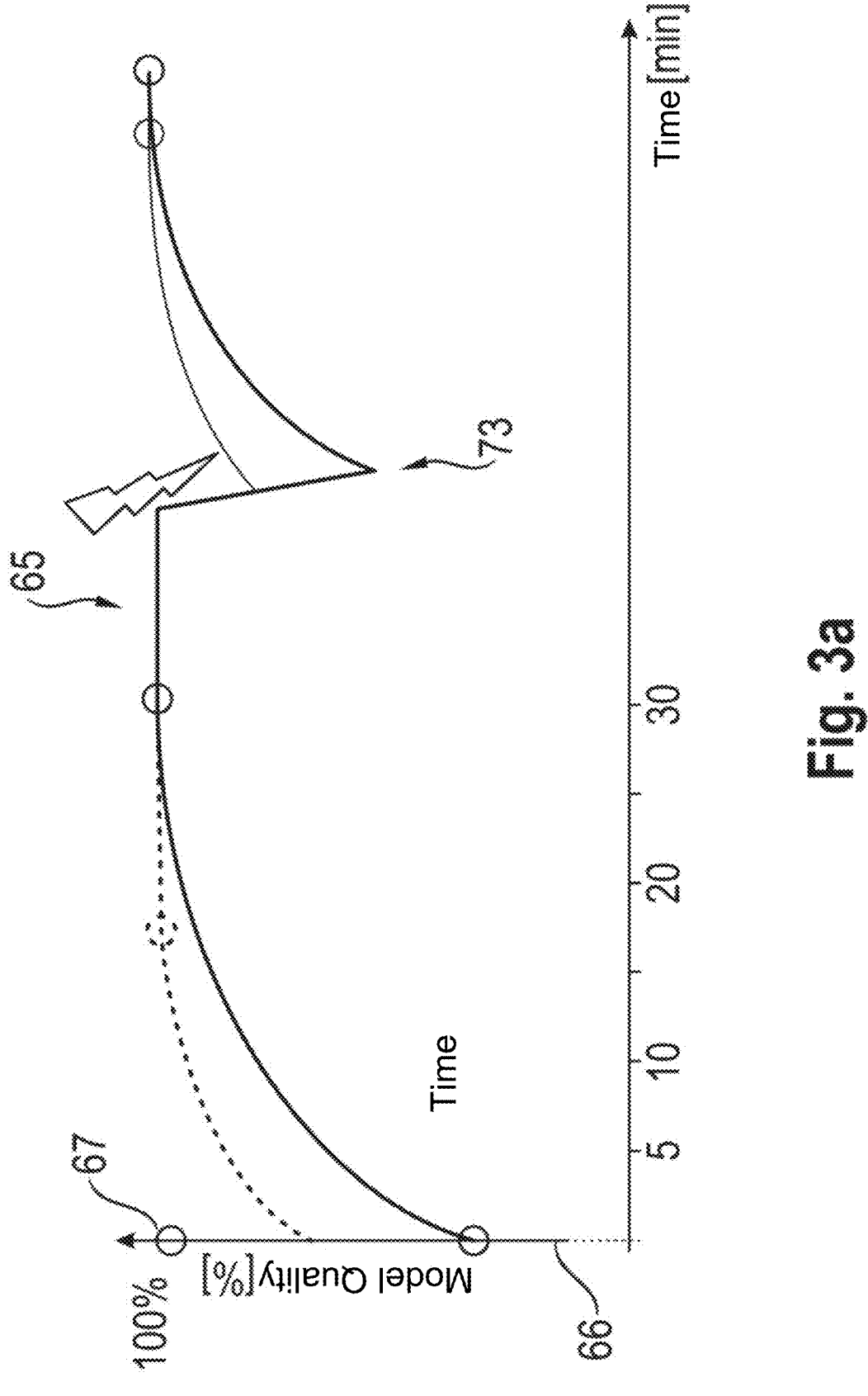
FIG. 3a illustrates an example of a map used by the driver assistance system.

The driver assistance system 36 and, in particular, the map control system 57 associated therewith may also be such that the used context-related map 63 may be checked, such as always automatically be checked, if the conditions of the local context 61 change during the performance of an agricultural task in a local context 61, wherein the used context-related map 63 may then be automatically replaced by an adapted context-related map 63, such as if the threshold value 67 of the model quality 66 of the model quality module 65 is reached. According to FIG. 3a, the conditions in a local context 61 may change so significantly over the course of a day that the model quality 66 may experience a significant, even abrupt, deterioration 73. Causes for this may be, inter alia, growing cloud cover, dew setting in, changes in crop variety, changes in fertilizer and crop protection measures, changes in weed growth, fluctuations in the degree of maturity of the harvested material, and changes in yield.

The driver assistance system 36, and in particular the map control system 57 associated therewith, may also be such that the used contextual map 63 may be checked, such as always automatically be checked, whenever the agricultural production machine 1 is used under the same conditions on a subsequent day 68, wherein the used contextual map 63 may be replaced by an adapted contextual map 63 when the threshold value 67 of the model quality 66 is reached.

The driver assistance system 36, and in particular the map control system 57 associated therewith, may further be such that the used contextual map 63 may be checked, such as always automatically be checked, whenever the contextual map 63 is to be exchanged between different agricultural production machines under the same conditions at the same time 69 or on the following day 70, wherein the used contextual map 63 is automatically replaced by an adapted contextual map 63 when the threshold value 67 of the model quality 66 is reached. In this context, it is within the scope of the invention that the different production machines 1 comprise agricultural production machines 1 of one machine fleet or agricultural production machines 1 of different machine fleets.

In addition, the driver assistance system 36, and in particular the map control system 57 associated therewith, may be such that the used contextual map 63 may be checked, such as always automatically be checked, whenever the contextual map 63 is to be exchanged between agricultural production machines 1 operating in different regions 71, wherein the used contextual map 63 may be automatically replaced by an adapted contextual map 63 when the threshold value 67 of the model quality 66 is reached.

Furthermore, the driver assistance system 36 and, in particular, the map control system 57 associated therewith may be such that the used contextual map 63 may be checked, such as always automatically be checked, whenever the contextual map 63 is to be exchanged between agricultural production machines 1 that are used at different times 72 of a year, wherein the different times 72 comprise the times 72 of the same year or of different years, wherein the used contextual map 63 is automatically replaced by an adapted contextual map 63 when the threshold value 67 of the model quality 66 is reached. In this way, the influence of harvesting earlier or later in a year on the harvest result is also taken into account.

In one or some embodiments, the control assembly 46 previously described may be configured to automatically distribute the optimized context-related maps 63, wherein the control assembly 46 has a database 52 with stored strategy parameters 51 and associated data on local contexts 61 (e.g., the data on the local contexts 61 is correlated to the stored strategy parameters 51 in order to determine which local contexts 61 are similar to the current local context, and then access stored strategy parameters 51 correlated to the stored local contexts 61 that are similar to the current local context), that the stored strategy parameters 51 of driver assistance systems 36 of agricultural production machines 1 have been successively automatically optimized in optimization routines 53 during the execution of agricultural tasks in local contexts 61 from initial strategy parameters 51 for adaptation to the particular local context 61, and that the driver assistance system 36 determines context data of the local context 61 of the agricultural task, such as by using the sensor systems 39, and automatically transmits them to the control assembly 46, that the control assembly 46 automatically determines context-related maps 63 adapted to the local context 61 on the basis of a comparison of the received context data with the context data from the database 52 (e.g., received context data is compared with stored context data to determine which of the stored context data is the same or similar to the received context data; for the stored context data that is the same or similar to the received context data, access the correlated context-related maps 63) and automatically transmits them to the driver assistance system 36 of the agricultural production machine 1, and that the driver assistance system 36 automatically uses the transmitted context-related characteristic maps 63 as basic characteristic maps 60 (e.g., to generate the one or more working parameters, and then automatically control part or all of the agricultural production machine 1 with the one or more working parameters).

The control assembly 46 may be used in a particularly efficient manner if the control assembly 46 is arranged externally to the agricultural production machine 1, in particular, such that the control assembly 46 may be formed by one or more servers and communicates with the agricultural production machine 1 via the Internet, and/or a plurality of strategy parameters 51 originating from other, in particular similar, agricultural production machines 1 are stored in the database 52.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural production machine
2 Combine harvester
3 Harvesting header
4 Inclined conveyor
5 Harvested material flow
6 Threshing concave
7 Threshing unit
8 Deflection drum
9 Separating rotor assembly
10 Separating device
11 Grains
12 Returns pan
13 Feed floor
14 Screening level
15 Screening level
16 Fan
17 Cleaning device
18 Elevator
19 Grain tank
20 Straw chopper
21 Shredding device
22 Material spreading unit
23 Ground
24 Driving tines
25 Operating parameter
26 Threshing drum speed
27 Threshing gap
28 Deflection drum speed
29 Rotor speed
30 Vibration frequency and direction
31 Vibration frequency and direction
32 Fan speed
33 Straw chopper speed
34 Distribution device speed
35 Distribution device discharge point
36 Driver assistance system
37 Memory
38 Computer device
39 Sensor system
40 Internal information
41 External information
42 Saved information
43 Cab
44 Operating and display unit
45 Driver
46 Control assembly
47 Determination routine
48 Parameterizable strategy
49 Strategy specification
50 Application instruction
51 Strategy parameter
52 Database
53 Optimization routine
55 Characteristic diagram
56 Coefficient
57 Map control system
58 Initial operating point
59 Quality parameter
60 Basic map
61 Local context
62 Test step
63 Context-related map
64 Initial characteristic diagram
65 Model quality module
66 Model quality
67 Threshold value
68 Subsequent day
69 Same time
70 Subsequent doing 71 Regions
72 Times of a year
73 Degradation of the model quality

The invention claimed is:

1. An agricultural production machine configured to perform an agricultural task in a local context and to determine one or more working parameters of the agricultural production machine, the agricultural production machine comprising:

a sensor system;

one or more process units configured to perform one or more processes of the agricultural task; and a driver assistance system in communication with the sensor system, the driver assistance system configured to:

access a map control system, wherein the map control system comprises one or more basic characteristic maps and one or more context-related maps, wherein the one or more basic characteristic maps and one or more context-related maps are configured to optimize one or more work parameters of one or more process units of the agricultural production machine and to describe at least a relationship between the one or more working parameters of a respective process unit of the agricultural production machine and quality parameters using initial working points;

at least partly while performing the agricultural task, determine a local context, wherein the local context comprises one or more of: local weather; local climate; local crop type; local crop variety; local degree of maturation; or local soil condition;

determine whether at least one respective context-related map is correlated to the local context;

responsive to determining that the at least one respective context-related map is correlated to the local context;

access a model quality module that is configured to analyze a model quality of the at least one respective context-related map, wherein the model quality is configured to determine a time interval until optimization of the one or more working parameters resulting from a selected strategy specification being achieved;

access at least one threshold value for the time interval;

analyze, using the model quality module, the model quality of the at least one respective context-related map with regard to the at least one of threshold value for the time interval in which optimized working parameters from the selected strategy specification are generated by the at least one respective context-related map;

responsive to determining, based on the analysis, that the model quality of the at least one respective context-related map at least meets the at least one threshold value for the time interval in which the optimized working parameters are generated by the at least one respective context-related map, use the at least one respective context-related map as an initial map in order to generate the one or more working parameters; and responsive to determining, based on the analysis, that the model quality of the at least one respective context-related map does not meet the at least one threshold value for the time interval in which the optimized working parameters are generated by the at least one respective context-related map, use at least one respective basic characteristic map;

responsive to determining that the at least one respective context-related map is not correlated to the local context, use the at least one respective basic characteristic map as the initial map in order to generate the one or more working parameters; and automatically control the one or more process units of the agricultural production machine using the one or more working parameters in order to automatically perform the agricultural task in the local context.

2. The agricultural production machine of claim 1, wherein the map control system is configured to:

determine, during performance of the agricultural task, whether at least one condition of the local context changes; and responsive to determining that the at least one condition of the local context changes, replace a used context-related characteristic map with or change to usage of an adapted context-related characteristic map.

3. The agricultural production machine of claim 2, wherein the map control system assigned to the driver assistance system is configured to:

determine current conditions;

determine that the current conditions are identical to conditions assigned to a previously-used context-related map;

responsive to determining that the current conditions are identical to the conditions assigned to the previously-used context-related map, access, based on the current conditions, a previously-used context-related map; and responsive to determining the at least one threshold value is reached, replacing using the previously-used context-related map by an adapted context-related characteristic map.

4. The agricultural production machine of claim 2, wherein the local context comprises local weather or local climate;

wherein the map control system is configured to determine, during performance of the agricultural task, whether at least one condition of the local weather or the local climate changes; and responsive to determining that the at least one condition of the local weather or the local climate changes, replace the used context-related characteristic map with or change to usage of the adapted context-related characteristic map.

5. The agricultural production machine of claim 4, wherein the local weather or the local climate changes comprises changes in cloud cover or in dew setting.

6. The agricultural production machine of claim 2, wherein the local context comprises local crop variety or local crop type;

wherein the map control system is configured to determine, during performance of the agricultural task, whether at least one condition of the local crop variety or the local crop type; and responsive to determining that the at least one condition of the local crop variety or the local crop type changes, replace the used context-related characteristic map with or change to usage of the adapted context-related characteristic map.

7. The agricultural production machine of claim 2, wherein the local context comprises local soil condition;

wherein the map control system is configured to determine, during performance of the agricultural task, whether at least one condition of the local soil condition; and responsive to determining that the at least one condition of the local soil condition changes, replace the used context-related characteristic map with or change to usage of the adapted context-related characteristic map.

8. The agricultural production machine of claim 7, wherein the local weather or the local climate changes comprises changes in fertilizer.

9. The agricultural production machine of claim 1, wherein the map control system assigned to the driver assistance system is configured to:

determine one or more conditions for performing the agricultural task with the agricultural production machine;

determine whether the one or more conditions for performing the agricultural task with the agricultural production machine are identical or similar to conditions for performing the agricultural task with a different agricultural production machine; and responsive to determining that the one or more conditions for performing the agricultural task with the agricultural production machine are identical or similar to conditions for performing the agricultural task with the different agricultural production machine, exchange using a context-related map with a previously-used context-related map that was used by the different agricultural production machine.

10. The agricultural production machine of claim 9, wherein the map control system is further configured to replace the previously-used context-related map, that was used by the different agricultural production machine, in one or more respective agricultural production machine in a fleet, responsive to reaching the at least one threshold value of the model quality of the model quality module for a respective time period within different times of a year.

11. The agricultural production machine of claim 1, wherein the map control system is configured to determine whether a used context-related map is to be exchanged between agricultural production machines in a fleet which are in use in different regions by:

determining when the at least one threshold value of the model quality of the model quality module is reached; and responsive to determining the at least one threshold value is reached, exchanging the used context-related map between the agricultural production machines in the fleet.

12. The agricultural production machine of claim 1, wherein the map control system is configured to determine whether a used context-related map is to be exchanged between agricultural production machines in a fleet that are used at different times of a year by:

determining when the at least one threshold value of the model quality of the model quality module is reached; and responsive to determining the at least one threshold value is reached, exchanging the used context-related map between the agricultural production machines in the fleet; and wherein the different times of a year comprise times of a same year or of different years.

13. The agricultural production machine of claim 1, wherein a control assembly comprises a server-based solution and is configured to distribute the context-related maps that are optimized;

wherein the control assembly includes a database with stored strategy parameters correlated to data on local contexts;

wherein the stored strategy parameters in the database are of driver assistance systems of agricultural production machines that have been successively optimized in optimization routines during execution of agricultural tasks in local contexts from initial strategy parameters for adaptation to a particular local context;

wherein the driver assistance system is configured to determine context data of the local context of the agricultural task and to transmit the context data to the control assembly;

wherein, responsive to transmitting the context data so that the control assembly determines context-related characteristic maps adapted to the local context based on comparing the transmitted context data with the context data from the database, the driver assistance system is configured to receive the context-related characteristic maps and to use the context-related characteristic maps as basic characteristic maps; and wherein the driver assistance system is configured to determine context data of the local context of the agricultural task using data generated by the sensor system.

14. The agricultural production machine of claim 13, wherein the control assembly is positioned externally to the agricultural production machine; and wherein the control assembly is formed by one or more servers and configured to communicate with the agricultural production machine in order to distribute the at least one respective context-related map as the initial map.

15. The agricultural production machine of claim 1, wherein the driver assistance system is configured to determine optimized working parameters for the agricultural production machine to perform the agricultural task in a determination routine using a parameterizable strategy;

wherein the strategy comprises the strategy specification, an application instruction and the one or more optimized working parameters; and wherein the strategy is parameterized by strategy parameters for adaptation to the local context.

16. The agricultural production machine of claim 15, wherein the driver assistance system is configured to use the strategy specification as input parameters of an application instruction in the determination routine in order to determine the one or more optimized working parameters optimized with respect to the strategy specification as output parameters of the application instruction;

wherein the driver assistance system is configured to parameterize the strategy with initial strategy parameters at a beginning of execution of the agricultural task in order to determine the one or more optimized working parameters;

wherein the strategy comprises one or more characteristic maps;

wherein the driver assistance system is configured to determine the one or more optimized working parameters based on the strategy specification from the one or more characteristic maps using the application instruction; and wherein the characteristic map is designed as one or both of a basic characteristic map or as a parameterized characteristic map.

* * * * *